United States Patent [19]

Gasparaitis et al.

[11] Patent Number: 4,641,925
[45] Date of Patent: Feb. 10, 1987

[54] LIQUID CRYSTAL DISPLAY ASSEMBLY WITH PHOSPHORESCENT BACKLIGHTING

[75] Inventors: Bernard V. Gasparaitis, Tamarac; C. Patrick Richardson, Coral Springs, both of Fla.

[73] Assignee: Motorola, Inc., Schaumburg, Ill.

[21] Appl. No.: 841,988

[22] Filed: Mar. 20, 1986

[51] Int. Cl.$^4$ .......................... G02F 1/13; F21V 9/16; G01J 1/58; G01T 1/10
[52] U.S. Cl. .................................. 350/345; 250/458.1
[58] Field of Search ...................... 350/345; 250/458.1, 250/463.1

[56] References Cited
U.S. PATENT DOCUMENTS

| | | | |
|---|---|---|---|
| 4,221,112 | 9/1980 | Enomoto et al. | 350/345 X |
| 4,229,783 | 10/1980 | Eberhardt | 350/345 X |
| 4,236,791 | 12/1980 | Krüeger et al. | 350/345 |
| 4,240,711 | 12/1980 | Baur et al. | 350/345 |
| 4,276,633 | 6/1981 | Takami et al. | 350/345 X |
| 4,470,666 | 9/1984 | Eick | 350/345 X |

Primary Examiner—John K. Corbin
Assistant Examiner—Richard F. Gallivar
Attorney, Agent, or Firm—Martin J. McKinley; Daniel K. Nichols; Joseph T. Downey

[57] ABSTRACT

A backlighted liquid crystal display (LCD) assembly has a thin phosphorescent layer positioned between the display and the light source to provide an even distribution of light intensity across the viewing surface of the display. The phosphorescent layer includes a phosphor powder mixed into a resin. The mixture is molded into a thin sheet and then cut to size. The phosphorescent layer and an optional disiccant layer may be encapsulated between sheets of acrylic film. The phosphorescent layer may also include a phosphorescent coating that is applied to the rear surface of the LCD or to the front surface of the light source.

18 Claims, 4 Drawing Figures

LIQUID CRYSTAL DISPLAY ASSEMBLY WITH PHOSPHORESCENT BACKLIGHTING

BACKGROUND OF THE INVENTION

This invention relates to the field of display assemblies and more particularly to backlighted liquid crystal display assemblies.

Liquid crystal displays (LCD's) are well known for their ability to form predetermined images of alphanumeric characters and other patterns in response to appropriate electrical signals. Because LCD's are passive displays, i.e., the images themselves do not emit light, an external light source is necessary to illuminate the display. Under normal room lighting conditions, ambient light provides sufficient external light intensity to view the display, however, a supplemental light source is necessary when ambient light intensity is low.

Supplemental light sources are commonly positioned behind the LCD to "backlight" the display. In backlighting, light from the supplemental light source is transmitted through the background or non-image area of the display while the formed images obstruct light transmission, resulting in dark images against a bright background.

An exploded perspective view of a well known prior art LCD assembly with supplemental backlighting is illustrated in FIG. 1. The assembly utilizes a "light guide" to provide backlighting for LCD 10. Images 12, for example the illustrated numbers "1", "2" and "3", are formed against a background area 14 in response to appropriate electrical signals. The light guide 16 is typically made from a transparent plastic slab having an upper surface 18, a lower surface 20 (not visible in FIG. 1), and four bordering surfaces 22, 24, 26, and 28 (only surfaces 22 and 24 are visible in FIG. 1). Light sources 30 and 32, typically incandescent lamps or light emitting diodes (LED's), are respectively positioned in notches 34 and 36. Bottom surface 20 has two planes 38 and 40 depressed into the bottom surface, thereby forming a V-shaped wedge. A reflective coating covers bottom surface 20, depressed planes 38 and 40, areas 42 and 44 of top surface 18, and bordering surfaces 22, 24, 26, and 28, with the exception of notches 34 and 36 which remain transparent.

In operation, light emitted from sources 30 and 32 travels the length of the light guide toward planes 38 and 40, strikes the reflective coating thereon, and is reflected up through transparent surface 18. The light then passes through background area 14 of LCD 10, but is obstructed by images 12. Thus, images 12 appear dark against bright background area 14.

An important criterion for any supplemental light source is that it provide an even distribution of light intensity across the surface of the display, i.e., the light intensity at any lighted point on the display should be substantially the same as it is at any other lighted point. When this condition is not meet, the supplemental light source is said to have "hot spots", i.e., areas wherein the light intensity is brighter than other areas. Although the light guide probably provides the best distribution of light intensity of any supplemental light source, the distribution is not perfectly even.

To complicate the problem, the demand for smaller and more compact electronic products has reduced the space available for supplemental light sources. Consequently, when a light guide is used for supplemental lighting the thickness (distance between surfaces 18 and 20) of the light guide must be correspondingly reduced. As the light guide is made thinner, the distribution of light intensity becomes more irregular, resulting in objectionable hot spots.

SUMMARY OF THE INVENTION

It is an object of the invention to provide an improved display assembly with supplemental lighting.

It is a more specific object of the invention to provide a supplementally lighted passive display assembly having a very thin construction and a substantially even distribution of light intensity across the viewing surface of the display.

Briefly, the invention is a display assembly for use with a supplemental light source. The display assembly includes a thin phosphorescent layer positioned behind a display. When the rear surface of the phosphorescent layer is illuminated by light from the supplemental light source, light is emitted from the front surface of the phosphorescent layer into the display.

In another embodiment, the invention includes a thin phosphorescent layer positioned behind a liquid crystal display. A light guide having at least one light source is positioned behind the phosphorescent layer. When the rear surface of the phosphorescent layer is illuminated by light from the light guide, light is emitted from the front surface of the phosphorescent layer into the display.

In still another embodiment, the invention includes a thin phosphorescent layer positioned behind a transflective liquid crystal display. The thin phosphorescent layer is encapsulated between front and rear clear protective films wherein the edges of the front and rear films are joined together. A light guide having at least one light source is positioned behind the encapsulated phosphorescent layer. When the rear surface of the phosphorescent layer is illuminated by light from the light guide, light is emitted from the front surface of the phosphorescent layer into the display.

DESCRIPTION OF THE PREFERRED EMBODIMENT

Figure 1:
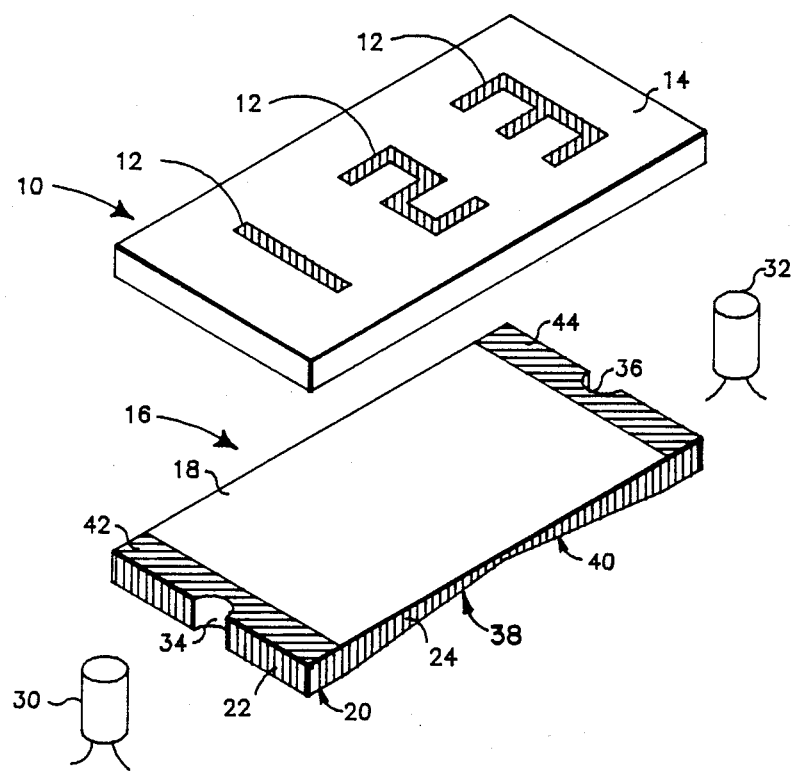
FIG. 1 is an exploded perspective view of a prior art display assembly having an LCD and a light guide type supplemental light source.
Figures 2, 3:
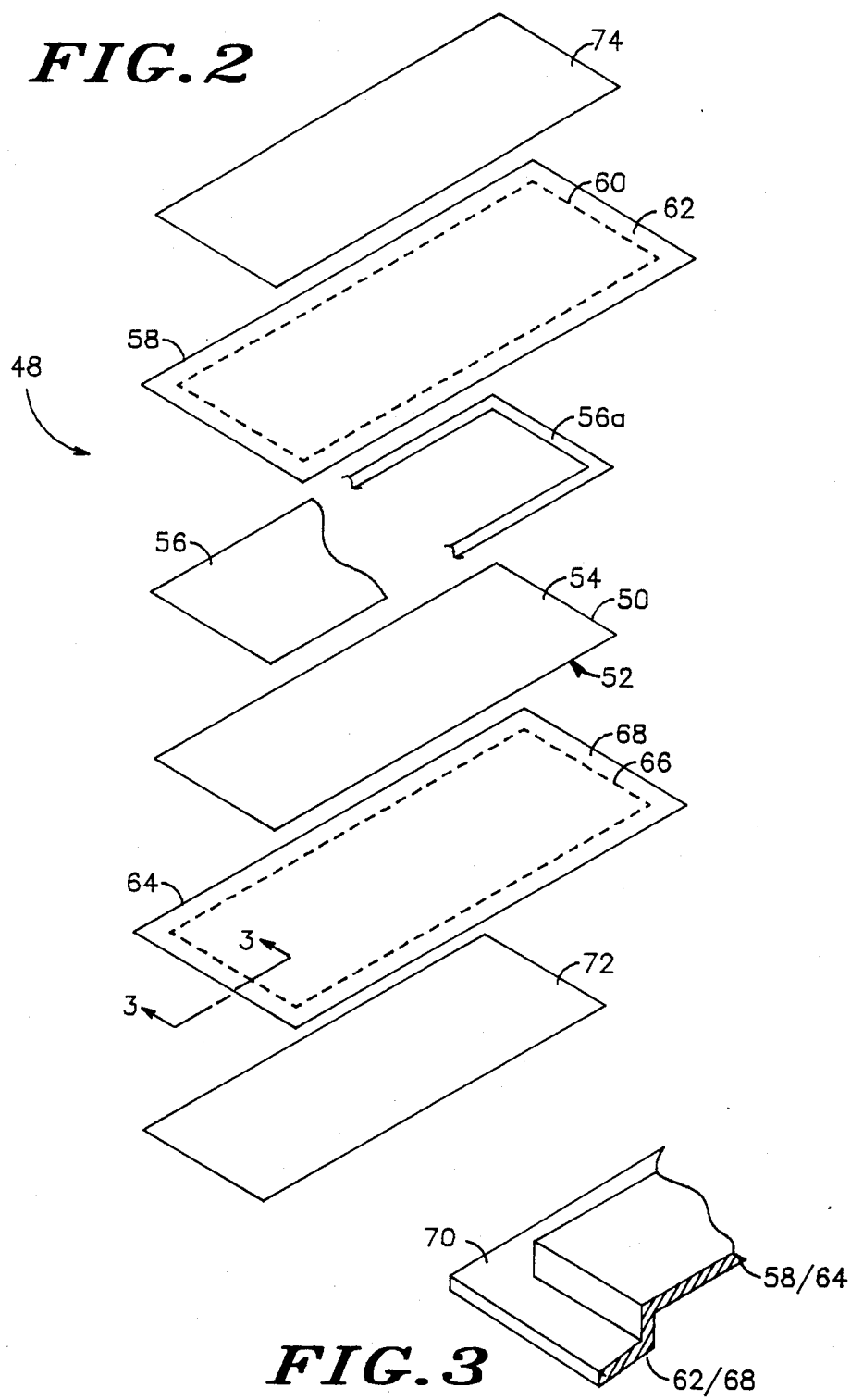
FIG. 2 is an exploded perspective view of the preferred phosphorescent assembly of the present invention.
FIG. 3 is a detailed perspective sectional view of the joint flange formed at the borders of the clear protective layers as seen along line 3—3 of FIG. 2.

Referring to FIG. 2, an exploded perspective view of a phosphorescent assembly 48 is illustrated. In a supplementally lighted LCD assembly, the phosphorescent assembly can be positioned between the display and the supplemental light source to evenly distribute the light emitted from the supplemental light source across the face of the display, thereby substantially reducing "hot spots".

Thin phosphorescent layer 50 is comprised of a phosphor powder mixed into a resin such as clear silicon rubber or plastic (for example a moldable thermoplastic). The proportions for the powder and resin mixture are preferably 40% by weight phosphor and 60% resin. This mixture may be molded into a thin sheet, which can later be cut to the desired size. A yellow/green color is provided by the use of Zinc Cadmium Sulfide phosphor powder, although other well known phosphorescent materials are also suitable.

The thickness of phosphorescent layer 50 is critical. As will be described in greater detail later, phosphorescent layer 50 is illuminated from rear surface 52 (not visible) and light is emitted from front surface 54. If phosphor layer 50 is too thin, any uneven light distribution from the supplemental light source will be visible through the layer; if the layer is too thick, the intensity of the light emitted from front surface 54 will be reduced. When phosphorescent layer 50 is comprised of 40% Zinc Cadmium Sulfide phosphor powder in a silicone rubber resin, the preferred thickness of the layer is 0.010 inches.

Located adjacent front surface 54 of phosphor layer 50 is an optional transparent desiccant layer to extract moisture from the assembly. Transparent desiccant layer 56 is preferably 0.005 inches thick and may be applied only at the periphery of phosphor layer 50, as illustrated by reference numeral 56a. Desiccant layer 56a is preferably comprised of nylon, although other well known desiccant materials may also be suitable. In the alternative, desiccant layer 56 may be positioned between rear surface 52 and transparent layer 64.

Positioned in front of phosphor layer 50 and over desiccant layer 56 (if provided) is a thin transparent layer 58. Layer 58 is preferably comprised of 0.005 inch thick acrylic film although other well known thin transparent films may also be suitable. Dotted line 60 on layer 58 indicates the outline of phosphor layer 50. Thus, border surface 62 overhangs the perimeter of phosphor layer 50. In a similar manner, bottom layer 64 is positioned beneath phosphor layer 50. The outline of phosphor layer 50 on bottom layer 64 is indicated by dotted line 66, thereby also providing layer 64 with a border surface 68. Border surfaces 62 and 68 are preferably joined with a well known thermally activated adhesive or by fuse bonding.

Border surfaces 62 and 68 are optionally heat formed to take the shape of a flange 70, as illustrated in the perspective detail of FIG. 3. As will be described later in greater detail, flange 70 assists in positioning the supplemental light source underneath the phosphorescent assembly.

Returning to FIG. 2, rear protective layer 64 can optionally be coated with a well known transparent pressure sensitive adhesive to bind the assembly to the supplemental light source. A similar adhesive layer 74 can also be applied to front protective layer 5 to bind the phosphorescent assembly to the rear surface of the LCD.

Figure 4:
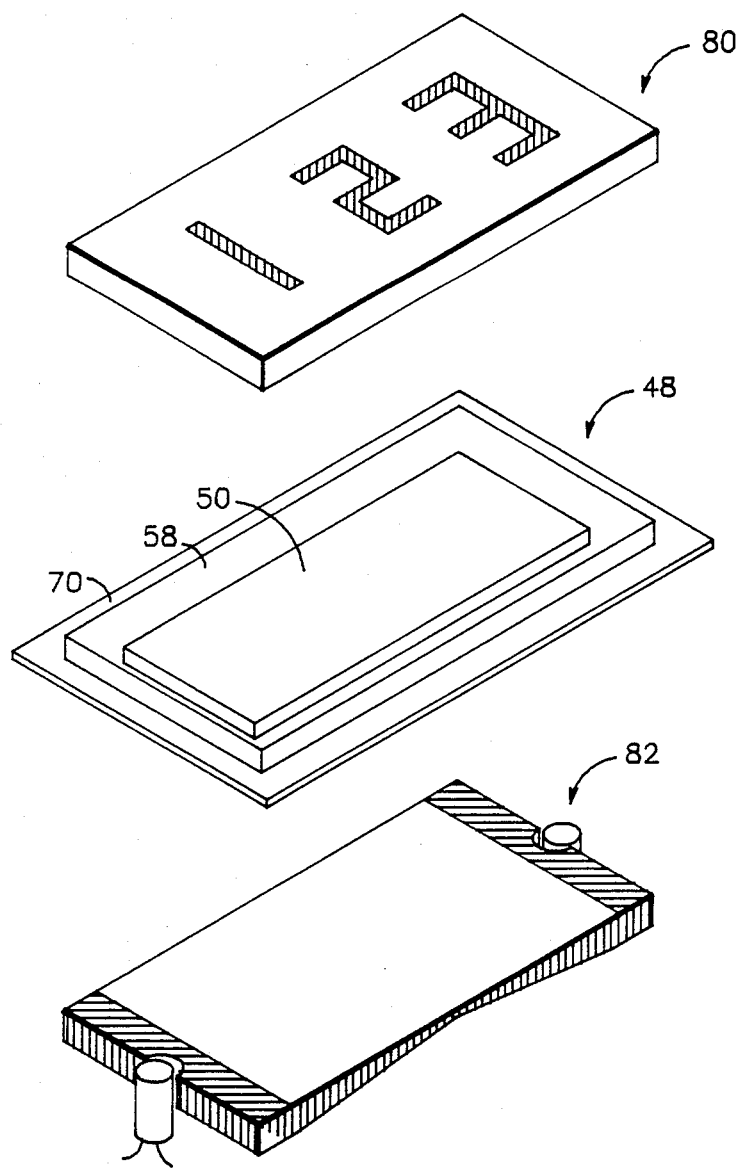
FIG. 4 is an exploded perspective view of the preferred display assembly illustrating an LCD, an encapsulated phosphorescent assembly, and a light guide type supplemental light source.

A complete message display assembly with phosphorescent supplemental backlighting is illustrated in FIG. 4. A passive display 80, such as LCD 10, is positioned above phosphorescent assembly 48. As previously described, display 80 can be bonded to phosphorescent assembly 48 through the use of optional transparent adhesive layer 74. A supplemental light source 82, for example light guide 16, is positioned beneath phosphorescent assembly 48. Flange 70 properly positions light source 82 beneath phosphorescent assembly 48. To bond light source 82 to phosphorescent assembly 48, optional transparent adhesive layer 72 can be positioned between phosphorescent assembly 48 and light source 82, as previously described.

LCD's can be classed according to their source of illumination. Transmissive LCD's are illuminated from the rear surface of the display by a light source. Reflective LCD's have a reflective layer on their rear surfaces so that ambient light entering through the front surface of the display is reflected back through the display. A third category, transflective LCD's, has a semi-transparent layer located on the rear surface of the display. This semi-transparent layer allows approximately half of the ambient light entering the front surface of the display to be reflected back through the display, and about half of the light generated by a supplemental backlight source to be transmitted through the rear surface of the display. In FIG. 3, when display 80 is an LCD, a transflective LCD is preferred although a transmissive LCD may also be suitable.

The operation of the present invention can be understood by referring to FIGS. 2 and 4. Light is emitted from supplemental light source 82 and passes through rear protective layer 64 of phosphorescent assembly 48, striking rear surface 52 of phosphor layer 50. This incident light excites the phosphor molecules in phosphor layer 50 causing light to be emitted from front surface 54. (Light is also emitted from rear surface 52, however, this is unimportant to the operation of the present invention) The emitted light passes through optional transparent desiccant layer 56, through front protective layer 58, and then through the transparent areas of display 80, thereby enhancing the visibility of the images formed in the display.

When incident light from light source 82 strikes rear surface 52 of phosphor layer 50, the phosphor molecules are momentarily excited to a higher energy state. When the energy level of the phosphor molecules decays to the ground state, light is emitted. Because phosphor layer 50 is very thin, the intensity of the light emitted from surface 54 is approximately the same as that emitted from surface 52. It is well known that the excitation process of phosphor molecules has a saturation level (e.g. 90% of maximum emitted light intensity) above which an increase in the intensity of incident light does not produce a significant increase in the intensity of light emitted from the phosphor material. Thus, if the light from supplemental light source 82 is sufficiently intense to excite any point on surface 52 of phosphor layer 50 to at least the saturation level, then other points ("hot spots") that are excited above the saturation level will not emit significantly more intense light than the lesser excited points. Phosphor layer 50, therefore, has the effect of reducing or "smoothing out" hot spots in the supplemental light source, thereby improving the readability of the display.

Other embodiments of the invention are also possible. For example, thin phosphor layer 50 can be a phosphorescent coating which is applied to the front surface of light source 82 or to the rear surface of display 80 by an appropriate silk screening or spraying process. In these embodiments, the phosphor powder is mixed into an appropriate well known resin and applied to one or both of the aforementioned surfaces. In the alternative, a phosphor coating 50 can also be applied to one of the surfaces of clear protective layers 58 or 64. As with the previously described molding process, the thickness of the phosphor coating is also critical and the process should be closely controlled to ensure that the layer has a substantially uniform thickness. Generally, when the phosphorescent material is 40% by weight Zinc Cadmium Sulfide, the coating thickness should be approximately 0.010 inches, although the thickness may vary somewhat depending on the particular resin material selected. When a phosphorescent coating is applied directly to either light source 82 or the rear surface of display 80, a thinner construction of the display results because clear protective layers 58 and 64, desiccant layer 56, and adhesive layers 72 and 74 may be eliminated. Transparent layers 58 and 64 can also be well known clear coatings that are applied to phosphorescent layer 50, for example by screening, spraying or dipping.

We claim:

1. A display assembly, for use with a supplemental light source, said display assembly comprising in combination:
   a display; and
   thin phosphorescent layer having front and rear surfaces, said front surface positioned adjacent said display, whereby light is emitted into said display from said front surface when said rear surface is illuminated by said light source.

2. The display assembly of claim 1, further comprising a phosphorescent assembly having front and rear clear protective layers respectively adjacent said front and rear surfaces of said thin phosphorescent layer, wherein the bordering surfaces of said front and rear protective layers are joined together, thereby encapsulating said thin phosphorescent layer.

3. The display assembly of claim 2, further comprising a thin transparent desiccant layer located between said front and rear clear protective layers.

4. The display assembly of claim 2, wherein the joined bordering surfaces of said front and rear protective layers are flange shaped.

5. The display assembly of claim 2, further comprising a clear adhesive between said display and said front protective layer to attach said display to said phosphorescent assembly.

6. The display assembly of claim 2, further comprising a clear adhesive attached to said rear protective layer for attaching said phosphorescent assembly to said light source.

7. The display assembly of claim 1, wherein said thin phosphorescent layer includes a mixture of silicone rubber and phosphorescent material.

8. The display assembly of claim 1, wherein said thin phosphorescent layer includes a mixture of plastic and phosphorescent material.

9. The display assembly of claim 1, wherein said thin phosphorescent layer includes a phosphorescent coating.

10. A liquid crystal display assembly, comprising in combination:
    a liquid crystal display;
    a thin phosphorescent layer having front and rear surfaces, said front surface positioned adjacent said display; and
    a light guide adjacent said rear surface of said thin phosphorescent layer for backlighting said display, said light guide having at least one light source;
    whereby, light is emitted from said front surface of said thin phosphorescent layer into said display when said rear surface is illuminated by light from said light guide.

11. The liquid crystal display assembly of claim 10, further comprising front and rear sheets of film respectively adjacent said front and rear surfaces of said thin phosphorescent layer, wherein the edges of said front and rear protective films are joined together, thereby encapsulating said thin phosphorescent layer and forming a phosphorescent assembly.

12. The liquid crystal display assembly of claim 11, further comprising a thin transparent desiccant layer located between said front and rear protective films.

13. The liquid crystal display assembly of claim 11, wherein the joined edges of said front and rear protective films are flange shaped.

14. The liquid crystal display assembly of claim 11, further comprising a clear adhesive between said display and said front film and between said rear film and said light guide.

15. The liquid crystal display assembly of claim 10, wherein said thin phosphorescent layer includes a molded mixture of silicone rubber and a phosphorescent powder.

16. The liquid crystal display assembly of claim 10, wherein said thin phosphorescent layer includes a molded mixture of clear thermoplastic and a phosphorescent powder.

17. The liquid crystal display assembly of claim 10, wherein said thin phosphorescent layer includes a phosphorescent coating.

18. A liquid crystal display assembly, comprising in combination:
    a transflective liquid crystal display;
    a clear front protective film positioned behind said display;
    a thin phosphorescent layer having front and rear surfaces, said front surface positioned behind said front film;
    a clear rear protective film positioned behind said thin phosphorescent layer, the edges of said front and rear films being joined so that said thin phosphorescent layer is encapsulated between said front and rear films; and
    a light guide positioned behind said rear protective film, said light guide having at least one light source;
    whereby, light is emitted from said front surface of said thin phosphorescent layer into said display when said rear surface is illuminated by light from said light guide.

* * * * *